Jan. 18, 1955   F. P. MATTSON   2,699,956
TRAILER STABILIZER
Filed March 12, 1952   3 Sheets-Sheet 1

INVENTOR
*Fred F. Mattson,*
BY *Joseph G. Werner*
ATTORNEY

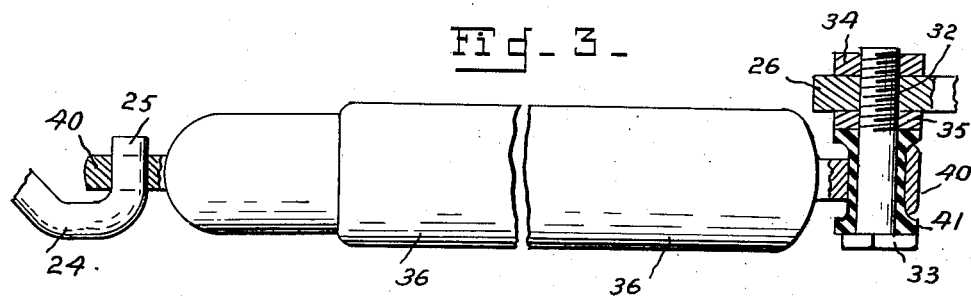
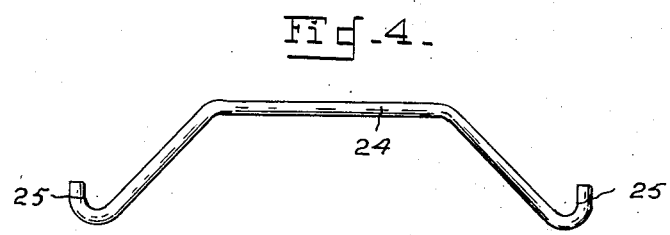
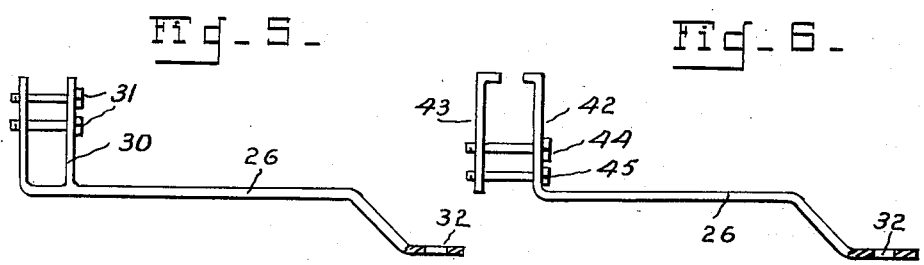

Jan. 18, 1955   F. P. MATTSON   2,699,956
TRAILER STABILIZER

Filed March 12, 1952   3 Sheets-Sheet 3

INVENTOR
*Fred P. Mattson*,

BY *Joseph G. Werner*

ATTORNEY

United States Patent Office 2,699,956
Patented Jan. 18, 1955

2,699,956

TRAILER STABILIZER

Fred P. Mattson, Elmwood, Wis.

Application March 12, 1952, Serial No. 276,157

4 Claims. (Cl. 280—457)

This invention relates to improvements in stabilizing mechanisms for coupling a towing vehicle and a trailer.

An additional object of the invention is the provision of such a mechanism to eliminate side, vertical, and top sway, sliding or jack-knifing of a trailer.

Another object of the invention is to provide a stabilizer of the above kind which may be readily installed or removed with respect to the coupled vehicles.

Still another object of the invention is the provision of a device which will make coupled vehicles handle as a single unit.

A further object of the invention is the provision of such a mechanism which will act as a secondary hitch should the hitch proper become uncoupled.

A still further object of the invention is the provision of an improved stabilizing mechanism for coupling a towing vehicle and a trailer which is sturdy and durable in construction, reliable and efficient in operation and relatively simple and inexpensive to manufacture and assemble.

Other objects will in part be obvious and in part pointed out hereinafter and shown in the accompanying drawings wherein there is disclosed a preferred embodiment of the inventive concept.

The ordinary hitch or coupling in common use today is prey to varied ills and maladjustments not only from construction but from such indirection factors as tire inflation, and weight and balance of the trailer. The present invention eliminates many of these ills, in addition to increasing the safety factor, by stabilizing the hitch at points found to be most critical to efficient operation.

In the drawings:

Fig. 3 is an enlarged sectional view in part taken substantially along the lines 3—3 of Fig. 1 as viewed in the direction indicated by the arrows;

Fig. 4 is a side elevational view illustrating one form of the forward support of the stabilizer;

Fig. 5 is a side elevational view illustrating one form of a rear support shown in Fig. 5;

Fig. 6 is a side elevational view illustrating a modification of the support shown in Fig. 5.

Figure 2:
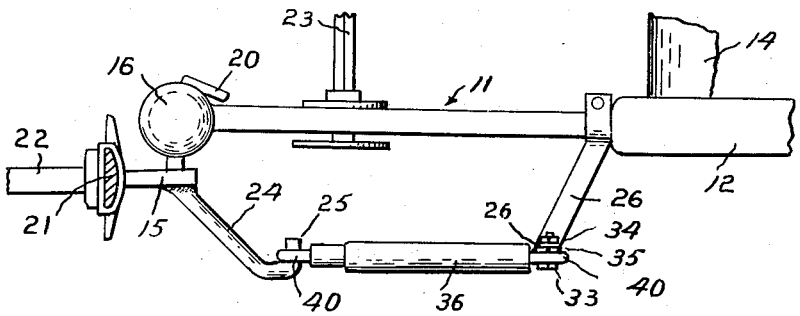
Fig. 2 is a vertical sectional view taken substantially along the lines 2—2 of Fig. 1 as viewed in the direction indicated by the arrows.

Having reference now to the drawings in detail, the stabilizing mechanism of the present invention generally indicated at 10 is adapted to be employed in conjunction with any conventional connecting hitch such as the triangular section of a trail frame 11 projecting from the front of a trailer 12 under a small platform 13 which usually carries cylindrical tanks 14 for gas or similar combustibles. The usual support 15 for the ball and socket 16 (see Fig. 2), which is provided with any suitable locking device 20, is clamped securely to the rear bumper 21 of the towing vehicles not shown herein. It will be appreciated that towing vehicles used to tow trailers have substantial bumpers with heavy reinforced brackets 22 but the use of the present invention is contemplated with other satisfactory and conventional ball and socket supports. It will also be appreciated that hitch supports 15, preferentially shown here secured to the bumper of the towing vehicle, are often attached directly to the frames of the towing vehicles.

The triangular section of the trailer frame 11 in addition to the socket 16 may be provided with any form of conventional third wheel or adjustable jack stand shown in part at 23. Such a third wheel 23 is commonly used to support the forward end of the trailer when the towing vehicle is disconnected therefrom.

Figure 7:
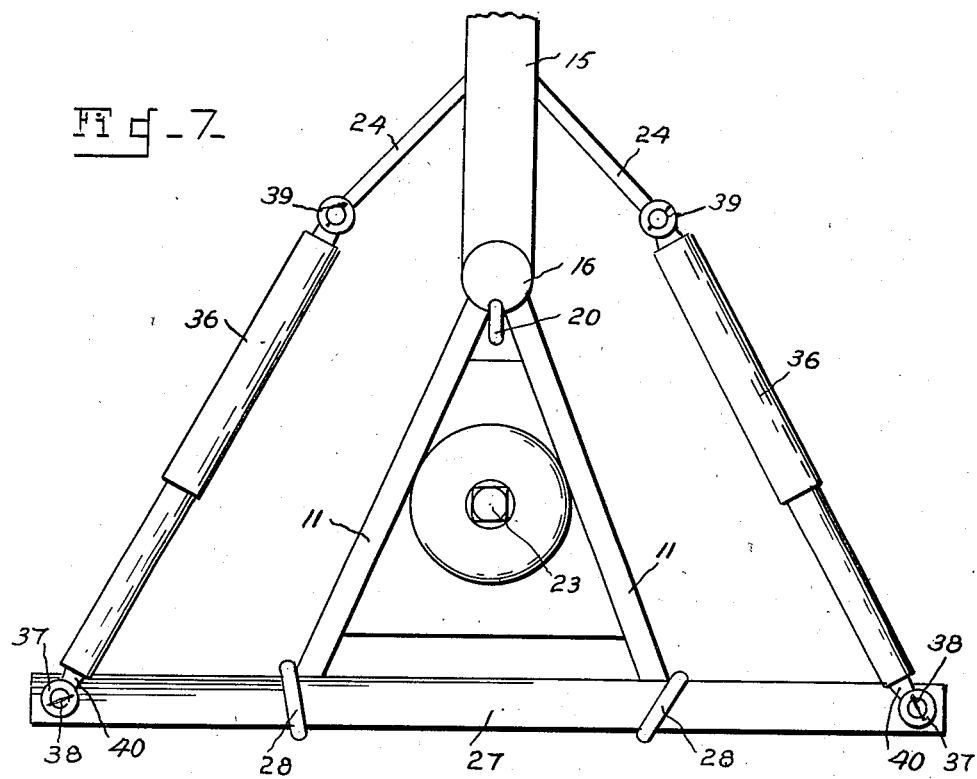
Fig. 7 is a plan view of a modification of the stabilizer according to the present invention attached to a hitch support and a trailer frame shown in end fragment.

Coming now to the particular features of the invention, there is welded to or formed as an integral part of ball and socket support 15 a metal bracket 24 extending outwardly and downwardly at an angle which will be described hereinafter and whose outer extremities 25 are bent vertically upward. On either side of the triangular section of the trailer frame 11 at a point close to the trailer proper are detachably mounted brackets 26, having substantially U-shaped ends 30 adapted to fit snugly around the trailer frame and provided with suitable clamping bolts and nuts 31. Brackets 26 extend outwardly and downwardly at an angle and for a critical length which will be described hereinafter. The outer ends of brackets 26 are provided with holes 32 to receive bolts 33 secured thereto by nuts 34 and 35, the bolts being positioned on the under side of brackets 26. In lieu of nuts 34 and 35, bolts 33 may be secured by means of washers 37 and cotter pins 38 as shown in Fig. 7.

Between forward bracket 24 and rear brackets 26 are double-acting horizontal shock absorbers 36 which are particularly suited for the present stabilizing mechanism. Each of shock absorbers 36 has welded to each end thereof metal rings 40. Forward rings 40 ride over and on the upwardly projecting ends 25 of bracket 24. It will be appreciated that inasmuch as no locking means is fitted on the ends 25 of bracket 24 the forward rings 40 are held in operative position by gravity. However, in the modification shown in Fig. 7, cotter pins 39 through the ends 25 of bracket 24 hold the rings 40 in place. Rear rings 40 are secured to brackets 26 by bolts 33, riding within rubber grommets 41.

Fig. 6 shows a modification of brackets 26 constructed so that it may be secured to trailer frames of various sizes. The frame securing end of this modification is formed of parallel metal plates 42 and 43 adapted to be clamped securely to a trailer frame by means of nuts and bolts 44 and 45.

With reference to the angle of bracket 24 it has been found that the distance of the shock absorber carrying ends 25 from the towing vehicle is critical for peak efficiency. This bracket 24, as are brackets 26 is bent downwardly so that the flexing of the shock absorbers 36 will clear with the trailer frame and hitch when the towing vehicle and the trailer are not in a straight line, one behind the other, as in taking a sharp curve or in parking.

The length of brackets 26 is determined by the positioning of shock absorbers 36. It has been found that when shock absorbers 36 are positioned so that an extended line through their connecting ends will approximate the forward corners of the trailer, the best operative results are obtained. By locating the horizontal shock absorbers 36 in this direction the shock absorbers meet and counteract against the force of the corner of the trailer when the trailer is turned. Any position deviating from this direction tends to direct pressure to the brackets alone.

Figure 1:
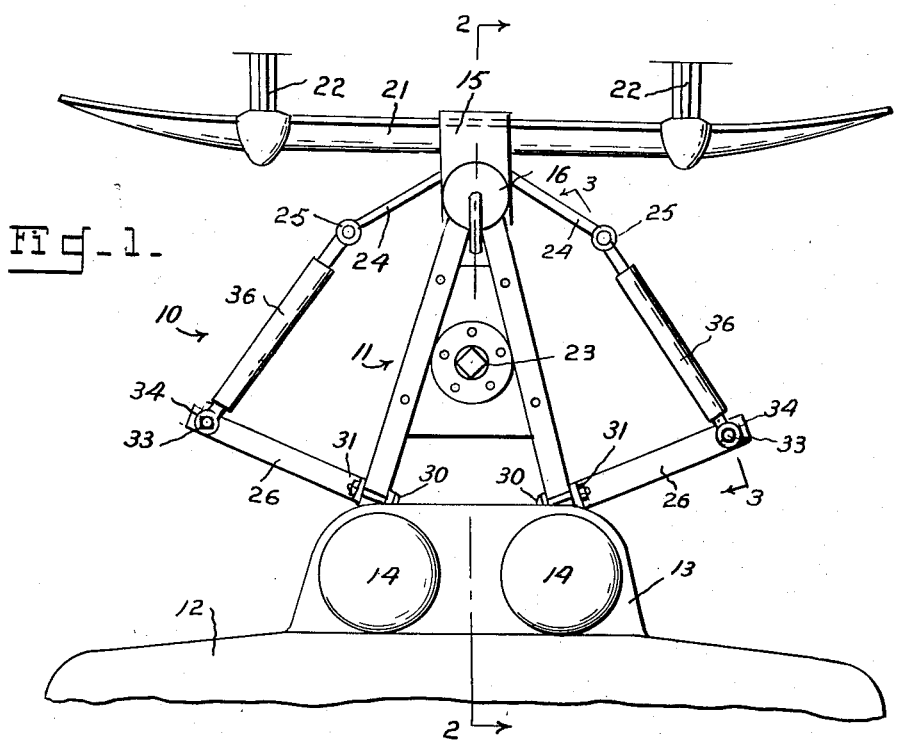
Fig. 1 is a plan view of one form of a stabilizer according to the present invention connected to a trailer and a towing vehicle shown in end fragment.

Fig. 7 shows a modification of the means to secure the rearwardly extending ends of shock absorbers 36. Brackets 26, shown in Figs. 1, 5 and 6, are supplanted by a single bar 27 parallel to the front of the trailer and secured to the frame 11 by means of clamping U bolts 28. In this form of the device rings 40 rest on bar 27 and are secured thereto by bolts capped with washers 37 and cotter pins 38.

Referring back, when the towing vehicle and the trailer are both facing a forward or in-line position, shock absorbers 36 are approximately each half extended providing maximum freedom to the hitch on curves. In addition the slightly lowered position of the shock absorbers and their cooperating brackets permits these stabilizing units full action under the hitch without interference.

Inasmuch as the shock absorbers are connected to fixed brackets and not directly to either the bodies of the towing vehicle or the trailer vibration, a prime source of wear, is reduced to a minimum, greatly increasing the life of the mechanism.

Now from the foregoing it will be seen that there is herein provided an improved stabilizing mechanism for the coupling of a towing vehicle and a trailer which accomplishes all the objects of this invention, and others, including many advantages of great practical utility and commercial importance.

As there are varied embodiments of this inventive concept, and as various modifications may be made in the embodiments hereinbefore shown and described, it is to be understood that all matter herein is to be interpreted merely as illustrative and not in a limiting sense.

I claim:

1. A stabilizer for a towing vehicle and trailer vehicle coupled by an articulated hitch which comprises, a forward bracket for rigid attachment to the towing vehicle, a rearward bracket for rigid attachment to the trailer, the said brackets including arms extending outwardly of the hitch, an expansible and contractable shock absorbing member pivotally connected between said bracket arms at one side of said hitch and supported in a substantially horizontal position, the rear end of said shock absorber being disposed at a greater horizontal distance from the longitudinal center line of the vehicles when they are in an in-line position than the front end of said shock absorber, the difference in distance being of such magnitude as to cause said shock absorber to pass through a cycle of expansion and contraction as the vehicles negotiate a 90° turn.

2. A stabilizer for a towing vehicle and trailer vehicle coupled by an articulated hitch which comprises, a forward bracket for rigid attachment to the towing vehicle, a rearward bracket for rigid attachment to the trailer, the said brackets including arms extending outwardly of the hitch, an expansible and contractable shock absorbing member pivotally connected between said bracket arms at one side of said hitch and supported in a substantially horizontal position, the said shock absorbing member being disposed in a plane vertically offset from the plane of said hitch, means in one of said pivotal connections which permits slight vertical pivotal movement of the shock absorbing member whereby to stabilize said hitch when subjected to vertical forces such as bounce, the rear end of said shock absorber being disposed at a greater horizontal distance from the longitudinal center line of the vehicles when they are in an in-line position than the front end of said shock absorber, the difference in distance being of such magnitude as to cause said shock absorber to pass through a cycle of expansion and contraction as the vehicles negotiate a 90° turn.

3. A stabilizer for a towing vehicle and trailer vehicle coupled by an articulated hitch which comprises, a forward bracket for rigid attachment to the towing vehicle, a rearward bracket for rigid attachment to the trailer, the said brackets each including arms extending outwardly of opposed sides of the hitch, and expansible and contractable shock absorbing members pivotally connected between said bracket arms at opposed sides of said hitch and supported in substantially horizontal positions, the rear ends of said sock absorbers being disposed at a greater horizontal distance from the longitudinal center line of the vehicles when they are in an in-line position than the front ends of said shock absorbers, the difference in distance being of such magnitude as to cause said shock absorbers to pass through a cycle of expansion and contraction as the vehicles negotiate a 90° turn.

4. A stabilizer for a towing vehicle and trailer vehicle coupled by an articulated hitch which comprises, a forward bracket for rigid attachment to the towing vehicle, a rearward bracket for rigid attachment to the trailer, the said brackets each including arms extending outwardly of opposed sides of the hitch, and expansible and contractable shock absorbing members pivotally connected between said bracket arms at opposed sides of said hitch and supported in substantially horizontal positions, the said shock absorbing members being disposed in planes vertically offset from the plane of said hitch, means in one of the pivotal connections of each shock absorber which permits slight vertical pivotal movement of said shock absorbers whereby to stabilize said hitch when subjected to vertical forces such as bounce, the rear ends of said shock absorbers being disposed at a greater horizontal distance from the longitudinal center line of the vehicles when they are in an in-line position than the front ends of said shock absorbers, the difference in distance being of such magnitude as to cause said shock absorbers to pass through a cycle of expansion and contraction as the vehicles negotiate a 90° turn.

References Cited in the file of this patent

UNITED STATES PATENTS

| | | |
|---|---|---|
| 2,085,260 | Keys | June 29, 1937 |
| 2,225,130 | Otto et al. | Dec. 17, 1940 |
| 2,378,297 | Hetzler | June 12, 1945 |
| 2,470,383 | Wakeman | May 17, 1949 |
| 2,498,780 | Winchester | Feb. 28, 1950 |
| 2,519,564 | Hagg | Aug. 22, 1950 |
| 2,596,902 | Krause | Apr. 7, 1948 |

FOREIGN PATENTS

| | | |
|---|---|---|
| 72,058 | Austria | July 10, 1916 |